United States Patent
Fujimoto et al.

(10) Patent No.: US 11,280,275 B2
(45) Date of Patent: Mar. 22, 2022

(54) INTERNAL COMBUSTION ENGINE

(71) Applicant: AISIN CORPORATION, Kariya (JP)

(72) Inventors: Seiichi Fujimoto, Kariya (JP);
Tomohiro Kozaki, Kariya (JP);
Masaaki Kaneko, Kariya (JP); Suguru Kamiya, Kariya (JP); Atsushi Hanaura, Kariya (JP); Tatsuki Okude, Kariya (JP); Tomoaki Fukao, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/263,271

(22) PCT Filed: Jul. 10, 2019

(86) PCT No.: PCT/JP2019/027296
§ 371 (c)(1),
(2) Date: Jan. 26, 2021

(87) PCT Pub. No.: WO2020/022062
PCT Pub. Date: Jan. 30, 2020

(65) Prior Publication Data
US 2021/0172389 A1 Jun. 10, 2021

(30) Foreign Application Priority Data
Jul. 27, 2018 (JP) .............................. JP2018-141484

(51) Int. Cl.
*F02D 13/02* (2006.01)
*F02D 41/00* (2006.01)
(Continued)

(52) U.S. Cl.
CPC ..... *F02D 13/0234* (2013.01); *F02D 41/0097* (2013.01); *F02D 41/062* (2013.01);
(Continued)

(58) Field of Classification Search
CPC ............. F02D 13/0234; F02D 41/0097; F02D 41/062; F02D 41/38; F02D 2200/0414;
(Continued)

(56) References Cited

U.S. PATENT DOCUMENTS

| 4,184,460 A * | 1/1980 | Harada | ................. F02D 41/064 123/483 |
| 5,979,413 A * | 11/1999 | Ohnuma | ............... F02D 41/062 123/491 |

(Continued)

FOREIGN PATENT DOCUMENTS

| JP | 2006017004 A | 1/2006 |
| JP | 2007016710 A | 1/2007 |

(Continued)

OTHER PUBLICATIONS

International Search Report (with English Translation) and Written Opinion issued by the Japan Patent Office dated Oct. 15, 2019 in corresponding International Patent Application No. PCT/JP2019/027296, 10 pages.

*Primary Examiner* — Joseph J Dallo
(74) *Attorney, Agent, or Firm* — Buchanan Ingersoll & Rooney PC (57) ABSTRACT

An internal combustion engine includes an internal combustion engine body including an intake valve and an exhaust valve, and a controller configured or programmed to perform a control to set a rotational speed of the internal combustion engine body to a predetermined rotational speed based on an environmental temperature at a time of starting the internal combustion engine body, and perform a control to drive the internal combustion engine body at the set predetermined rotational speed during a time period until when fuel is supplied to a combustion chamber of the internal combustion engine body and first ignition is performed.

11 Claims, 4 Drawing Sheets

(51) Int. Cl.
*F02D 41/06* (2006.01)
*F02D 41/38* (2006.01)
*F02P 5/15* (2006.01)

(52) U.S. Cl.
CPC ............ *F02D 41/38* (2013.01); *F02P 5/1506* (2013.01); *F02D 2200/0414* (2013.01); *F02D 2200/70* (2013.01)

(58) Field of Classification Search
CPC ............ F02D 2200/70; F02D 13/0219; F02D 2200/101; F02D 35/025; F02D 2041/001; F02D 41/0002; F02D 31/002; F02D 31/007; F02D 41/064; F02D 29/02; F02P 5/1506; F02P 5/045; Y02T 10/12; F02N 11/08
See application file for complete search history.

(56) References Cited

U.S. PATENT DOCUMENTS

| | | | | |
|---|---|---|---|---|
| 6,170,462 | B1* | 1/2001 | Kondo | F02D 41/009 |
| | | | | 123/406.18 |
| 6,257,207 | B1* | 7/2001 | Inui | F02D 41/062 |
| | | | | 123/491 |
| 8,812,221 | B2* | 8/2014 | Hozumi | F02D 41/042 |
| | | | | 701/112 |
| 10,059,417 | B1* | 8/2018 | Hilbert | F02N 11/08 |
| 10,711,711 | B2* | 7/2020 | Anzawa | F02D 41/10 |
| 2002/0007821 | A1* | 1/2002 | Isobe | F02D 41/32 |
| | | | | 123/480 |
| 2002/0056272 | A1* | 5/2002 | Isobe | F02D 41/221 |
| | | | | 60/285 |
| 2005/0016486 | A1* | 1/2005 | Hayman | F02N 19/004 |
| | | | | 123/179.16 |
| 2006/0219231 | A1* | 10/2006 | Uchida | F01N 3/22 |
| | | | | 123/585 |
| 2010/0286878 | A1* | 11/2010 | Lindgren | F02D 41/064 |
| | | | | 701/54 |
| 2010/0294027 | A1* | 11/2010 | Kondo | F02D 41/1498 |
| | | | | 73/114.02 |
| 2017/0089279 | A1* | 3/2017 | Yoeda | F02M 26/47 |
| 2017/0314495 | A1 | 11/2017 | Kanaya | |
| 2018/0029589 | A1* | 2/2018 | Dextreit | B60W 50/0097 |

FOREIGN PATENT DOCUMENTS

| | | |
|---|---|---|
| JP | 2007239461 A | 9/2007 |
| JP | 2009001250 A | 1/2009 |
| JP | 2009041490 A | 2/2009 |
| JP | 2009299538 A | 12/2009 |
| JP | 2013241879 A | 12/2013 |
| JP | 2016089707 A | 5/2016 |

\* cited by examiner

FIG.1

FIRST (SECOND) EMBODIMENT

FIG.2

FIRST EMBODIMENT

FIG. 3
FIRST EMBODIMENT

FIG. 4
FIRST EMBODIMENT

FIG. 5

FIG. 6
FIRST EMBODIMENT

FIG. 7
SECOND EMBODIMENT

FIG. 8
SECOND EMBODIMENT

FIG. 9

SECOND EMBODIMENT

CONTROL PROCESS AT TIME OF STARTING ENGINE

INTERNAL COMBUSTION ENGINE

TECHNICAL FIELD

The present invention relates to an internal combustion engine, and more particularly, it relates to an internal combustion engine including a controller configured or programmed to perform a control to warm a combustion chamber before the first ignition.

BACKGROUND ART

In general, an internal combustion engine including a controller configured or programmed to perform a control to warm a combustion chamber before the first ignition is known. Such an internal combustion engine is disclosed in Japanese Patent Laid-Open No. 2009-299538, for example.

Japanese Patent Laid-Open No. 2009-299538 discloses an engine including a control device configured or programmed to perform a control to warm a combustion chamber before the first ignition by motoring, and a variable valve timing mechanism. The control device is configured or programmed to uniformly set the closing timing of an intake valve to be more advanced than the reference timing (during steady operation) by the variable valve timing mechanism at the time of motoring. Thus, the engine closes the intake valve early on the bottom dead center side and retains a large amount of intake air in a cylinder so as to compress the intake air and raise the temperature in the cylinder. When the temperature in the cylinder rises, a fuel is effectively atomized, and thus an exhaust gas immediately after the first explosion is reduced.

PRIOR ART

Patent Document
Patent Document 1: Japanese Patent Laid-Open No. 2009-299538

SUMMARY OF THE INVENTION

Problem to be Solved by the Invention

However, in the engine disclosed in Japanese Patent Laid-Open No. 2009-299538, at the time of motoring, the closing timing of the intake valve is uniformly set to be more advanced than the reference timing (during steady operation), and it is difficult to perform an appropriate control to reduce the exhaust gas according to the environmental temperature of the engine. That is, in the engine described in Patent Document 1, the variable valve timing mechanism is not controlled in consideration of the environmental temperature such as cold start.

The present invention has been proposed in order to solve the aforementioned problem, and an object of the present invention is to provide an internal combustion engine capable of performing an appropriate control to reduce an exhaust gas according to the environmental temperature of the internal combustion engine.

Means for Solving the Problem

In order to attain the aforementioned object, an internal combustion engine according to an aspect of the present invention includes an internal combustion engine body including an intake valve and an exhaust valve, and a controller configured or programmed to perform a control to set a rotational speed of the internal combustion engine body to a predetermined rotational speed based on an environmental temperature at a time of starting the internal combustion engine body, and perform a control to drive the internal combustion engine body at the set predetermined rotational speed during a time period until when fuel is supplied to a combustion chamber of the internal combustion engine body and first ignition is performed.

As described above, the internal combustion engine according to this aspect of the present invention includes the controller configured or programmed to perform a control to set the rotational speed of the internal combustion engine body to the predetermined rotational speed based on the environmental temperature at the time of starting the internal combustion engine body, and perform a control to drive the internal combustion engine body at the set predetermined rotational speed during the time period until when the fuel is supplied to the combustion chamber of the internal combustion engine body and the first ignition is performed. Accordingly, for example, when the environmental temperature is low (in the case of cold start), it is possible to effectively warm the inside of the combustion chamber due to friction between a cylinder and a piston and inertia supercharging when the rotational speed of the internal combustion engine body is set to be particularly high, and thus an appropriate control to reduce an exhaust gas can be performed according to the environmental temperature of the internal combustion engine. When the inside of the combustion chamber is warmed, atomization of the fuel is promoted, and the exhaust gas generated at the time of the first ignition can be reduced.

The aforementioned internal combustion engine according to this aspect preferably further includes a variable valve mechanism configured to adjust an opening-closing timing of the intake valve under control of the controller, and the controller is preferably configured or programmed to perform a timing control to set a closing timing of the intake valve based on the predetermined rotational speed such that a largest amount of outside air is introduced.

According to this structure, the (largest amount of) outside air can be effectively introduced into the combustion chamber in consideration of inertia supercharging based on the rotational speed of the internal combustion engine body and intake pulsation, for example. Consequently, the pressure in the combustion chamber is effectively increased such that the inside of the combustion chamber can be effectively warmed, and thus a more appropriate control to reduce the exhaust gas can be performed according to the environmental temperature of the internal combustion engine.

In the aforementioned structure in which the timing control is performed, the controller is preferably configured or programmed to continue the timing control until a first cycle in which the fuel is supplied to the combustion chamber and the first ignition is performed, and to control the variable valve mechanism to restore a valve timing of the intake valve to that during steady operation in second and subsequent cycles.

In the second and subsequent cycles, the intake amount is increased due to the influence of recirculation of an EGR gas, for example, as compared with the first cycle, and thus it is necessary to set the valve timing to the predetermined valve timing. Therefore, with the structure described above, the timing control can be continued for a longer time as compared with a case in which the timing control is finished only at the initial stage of a period before the first ignition, and thus the inside of the combustion chamber can be more effectively warmed. Consequently, a more appropriate control to reduce the exhaust gas can be performed according to the environmental temperature of the internal combustion engine.

The aforementioned internal combustion engine according to this aspect preferably further includes a variable valve mechanism configured to adjust an opening-closing timing of the intake valve under control of the controller, and the controller is preferably configured or programmed to close the intake valve on a retardation angle side of an intermediate phase between a bottom dead center and a top dead center while a piston moves from the bottom dead center to the top dead center during the time period until when the fuel is supplied to the combustion chamber and the first ignition is performed.

According to this structure, a gas in the cylinder, the temperature of which has risen due to the friction between the piston and the cylinder, for example, can be blown back to the intake pipe side for a relatively long time during movement of the piston from the bottom dead center to the top dead center. That is, the high-temperature gas can be blown back to the intake pipe side for a time longer than at least half of the time required for the piston to move from the bottom dead center to the top dead center. Consequently, atomization of the fuel can be effectively promoted, and thus unburned fuel can be reduced while the exhaust gas can be reduced. Thus, the fuel injection amount at the time of cold start can also be reduced. The exhaust gas can be reduced, and thus the amount of precious metal used as a catalyst may be reduced.

In this case, the controller is preferably configured or programmed to close the intake valve at the top dead center or in a vicinity of the top dead center during the time period until when the fuel is supplied to the combustion chamber and the first ignition is performed.

According to this structure, the high-temperature gas in the cylinder can be blown back to the intake pipe side for a longer time while the piston moves from the bottom dead center to the top dead center. Consequently, atomization of the fuel can be promoted more effectively.

In the aforementioned internal combustion engine according to this aspect, the controller is preferably configured or programmed to supply the fuel to the combustion chamber and perform the first ignition at a timing at which a temperature in the combustion chamber exceeds a predetermined set temperature based on an estimation logic for estimating the temperature in the combustion chamber.

According to this structure, the estimation logic is used such that the controller does not need to perform a calculation to determine the timing for the first ignition, and thus the control load on the controller can be reduced.

In this case, the estimation logic preferably includes a map showing a relationship between the temperature in the combustion chamber and driving duration of the internal combustion engine body at the predetermined rotational speed.

According to this structure, with the map showing the relationship between the temperature in the combustion chamber and the driving duration (motoring duration) of the internal combustion engine body at the predetermined rotational speed, the timing for the first ignition can be easily determined without performing a complex calculation.

The aforementioned internal combustion engine according to this aspect preferably further includes a temperature sensor to measure a temperature in an intake pipe, and the controller is preferably configured or programmed to supply the fuel to the combustion chamber and perform the first ignition at a timing at which the temperature measured by the temperature sensor exceeds a predetermined set temperature.

According to this structure, the timing at which the fuel is supplied to the combustion chamber and the first ignition is performed can be accurately determined with the temperature sensor.

In the aforementioned internal combustion engine according to this aspect, the environmental temperature preferably includes at least one of a temperature of outside air around the internal combustion engine body or a temperature of cooling water of the internal combustion engine body.

According to this structure, a control to warm the inside of the combustion chamber can be performed before the first ignition with a temperature sensor that measures the temperature of the outside air around the internal combustion engine body or a temperature sensor that measures the temperature of the cooling water of the internal combustion engine body, which is generally provided in an internal combustion engine.

The aforementioned internal combustion engine according to this aspect preferably further includes a hybrid drive motor to drive a piston, and the controller is preferably configured or programmed to set the rotational speed of the internal combustion engine body to the predetermined rotational speed based on the environmental temperature at the time of starting the internal combustion engine body, and to control the hybrid drive motor to drive the internal combustion engine body at the set predetermined rotational speed during the time period until when the fuel is supplied to the combustion chamber and the first ignition is performed.

According to this structure, motoring is performed by the hybrid drive motor such that an appropriate control to reduce the exhaust gas can be performed according to the environmental temperature of the internal combustion engine.

MODES FOR CARRYING OUT THE INVENTION

Embodiments embodying the present invention are hereinafter described on the basis of the drawings.

First Embodiment

The structure of an engine 1 (an example of an internal combustion engine) according to a first embodiment is now described with reference to FIGS. 1 to 6.

Figure 1:
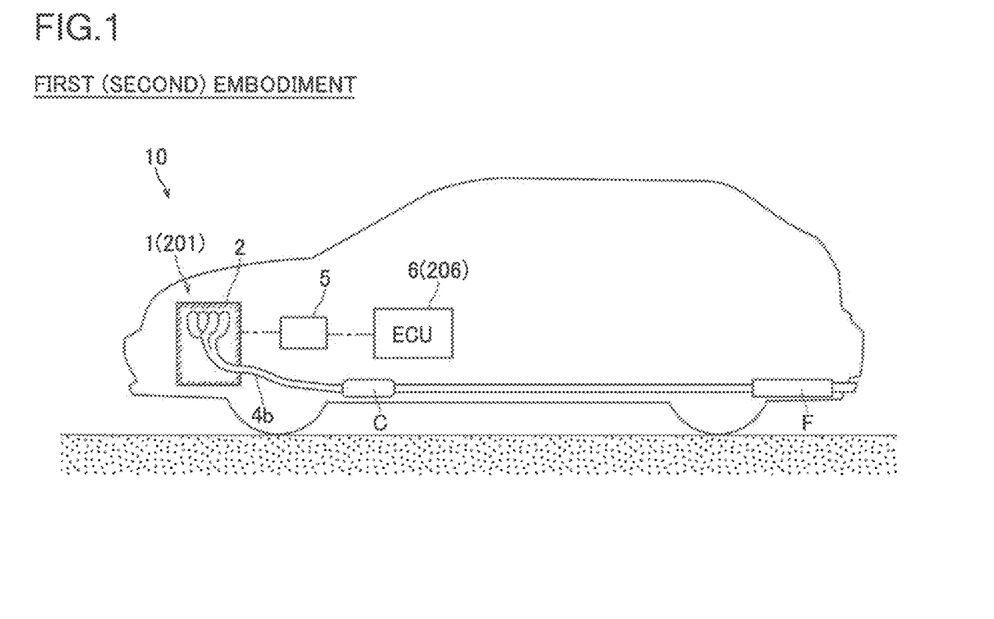
FIG. 1 A diagram schematically showing the structure of a vehicle according to a first (second) embodiment.

As shown in FIG. 1, the engine 1 according to the first embodiment is incorporated in a hybrid vehicle 10.

The engine 1 includes an engine body 2 (an example of an internal combustion engine body), a variable valve mechanism 3 (see FIG. 2), an intake pipe 4a (see FIG. 2) connected to the upstream side of the engine body 2, an exhaust pipe 4b connected to the downstream side of the engine body 2, an electric motor 5 (an example of a hybrid drive motor) used for motoring, and an engine control unit (ECU) 6 (an example of a controller).

Figure 2:
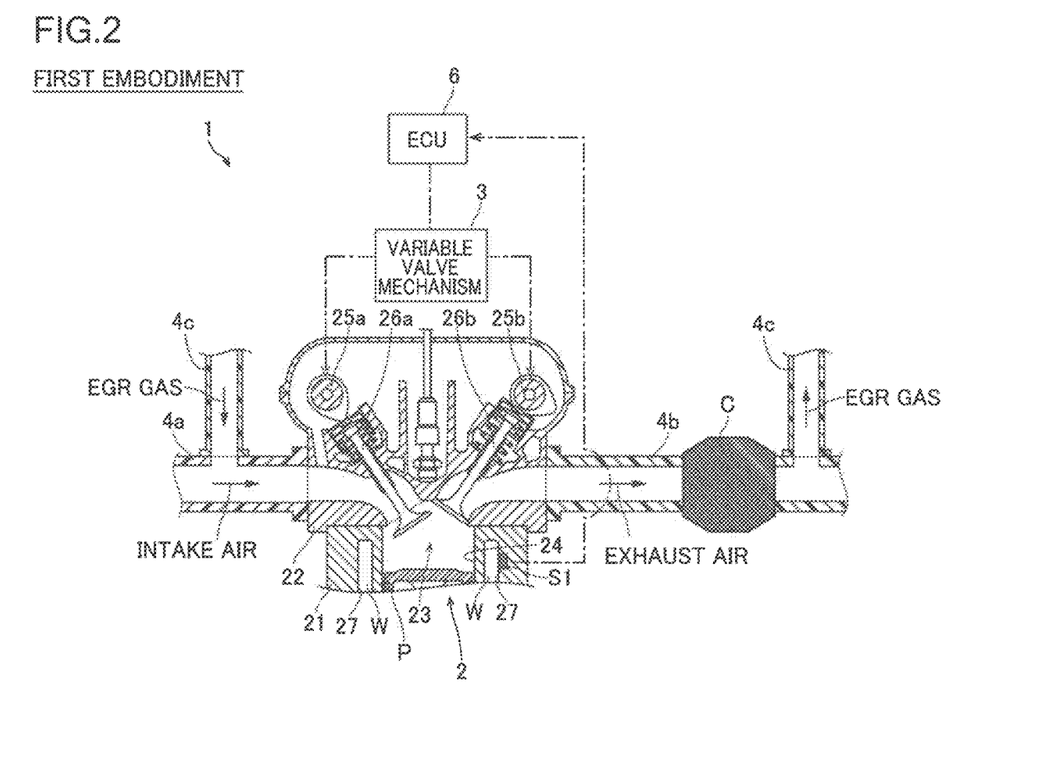
FIG. 2 A diagram showing the structure of an engine, a variable valve mechanism, and an ECU according to the first embodiment.

As shown in FIG. 2, the engine body 2 includes a cylinder block 21 and a cylinder head 22 attached to an upper portion of the cylinder block 21. The cylinder block 21 includes a cylinder 24 in which a combustion chamber 23 is provided inside. A crankshaft (not shown) is provided in the engine body 2. Furthermore, the engine body 2 includes an intake valve 26a and an exhaust valve 26b. The engine 1 opens and closes the intake valve 26a and the exhaust valve 26b at predetermined valve timings by rotating camshafts 25a and 25b by the power of the crankshaft.

The cylinder block 21 includes a water jacket 27 that circulates cooling water W to cool the engine 1. The water jacket 27 is arranged adjacent to the combustion chamber 23. At the time of motoring, the temperature of the engine 1 (the combustion chamber 23 and the cylinder 24) rises due to friction between a piston P and the cylinder 24 and the compression of air in the cylinder 24 (combustion chamber 23). Therefore, at the time of motoring, the cooling water W takes heat from the engine 1, the temperature of which has risen, such that the temperature of the cooling water W also rises.

The variable valve mechanism 3 is configured to adjust the opening-closing timings of the intake valve 26a and the exhaust valve 26b of the combustion chamber 23. Specifically, the variable valve mechanism 3 is configured to independently shift rotation of the camshafts 25a and 25b in a retard or advance direction in order to shift the opening-closing timings of the intake valve 26a and the exhaust valve 26b. The variable valve mechanism 3 is installed on a timing chain (not shown), and continuously changes the opening-closing timing of the intake valve 26a (exhaust valve 26b) while maintaining the cam phases and lift amount profiles. Therefore, the angular width of the valve opening period of the intake valve 26a (exhaust valve 26b) does not change. The variable valve mechanism 3 is an electric mechanism that can operate even before the engine is started.

That is, the variable valve mechanism 3 is configured to advance or retard both the opening timing (hereinafter referred to as the IVO (intake valve open)) and the closing timing (hereinafter referred to as the IVC (intake valve close)) of the intake valve 26a.

The variable valve mechanism 3 is also configured to advance or retard both the opening timing (hereinafter referred to as the EVO (exhaust valve open)) and the closing timing (hereinafter referred to as the EVC (exhaust valve close)) of the exhaust valve 26b. The variable valve mechanism 3 is configured to be driven under control of the ECU 6.

The intake pipe 4a is configured to supply intake air to the combustion chamber 23 via the intake valve 26a. The exhaust pipe 4b is configured to discharge exhaust air (exhaust gas) discharged from the combustion chamber 23 to the outside (atmosphere) via the exhaust valve 26b. The exhaust pipe 4b is provided with a catalyst C and a muffler F arranged on the downstream side of the catalyst C.

The intake pipe 4a and the exhaust pipe 4b are each provided with an EGR pipe 4c to recirculate an EGR gas (exhaust gas). The EGR pipe 4c is provided with an EGR valve (not shown) to open and close the EGR pipe 4c and an EGR gas cooler (not shown) to cool the EGR gas. An injector (not shown) that injects a fuel into an intake passage is provided in the intake pipe 4a (on the upstream side of the intake valve 26a).

The electric motor 5 is configured to drive the engine body 2 at a predetermined rotational speed (set rotational speed) at the time of motoring. The predetermined rotational speed (set rotational speed) is not a constant rotational speed, but a rotational speed that is reset each time motoring is performed. The set predetermined rotational speed (set rotational speed) does not vary during the course of one motoring operation. The electric motor 5 is configured to be driven under control of the ECU 6.

Structure of ECU

The ECU 6 is configured or programmed to control each portion of the engine 1. The ECU 6 is configured or programmed to control the electric motor 5 and the variable valve mechanism 3 to effectively warm the engine body 2 (the inside of the cylinder 24 and the inside of the combustion chamber 23) at the time of motoring. Thus, the ECU 6 effectively raises a pressure inside the cylinder 24 (inside the combustion chamber 23) to promote atomization of the fuel at the time of the first explosion (when the fuel is supplied to the combustion chamber 23 and ignited for the first time) and reduce the exhaust gas immediately after the explosion.

Specifically, in the first embodiment, the ECU 6 performs a control to set the rotational speed of the engine body 2 to a predetermined rotational speed based on the environmental temperature at the time of starting the engine body 2. Then, the ECU 6 controls the electric motor 5 to drive the engine body 2 at the set predetermined rotational speed (set rotational speed) during a time period until when the fuel is supplied to the combustion chamber 23 of the engine body 2 and the first ignition is performed.

The ECU 6 is configured or programmed to set the predetermined rotational speed (set rotational speed) to be lower as the environmental temperature becomes higher, and set the predetermined rotational speed (set rotational speed) to be higher as the environmental temperature becomes lower.

The environmental temperature refers to the temperature of the cooling water W that flows through the water jacket 27 of the engine body 2. The engine body 2 includes a temperature sensor S1 to measure the environmental temperature (the temperature of the cooling water W). The ECU 6 is configured or programmed to acquire information on the environmental temperature (the temperature of the cooling water W) from the temperature sensor S1 before starting motoring.

Figure 3:
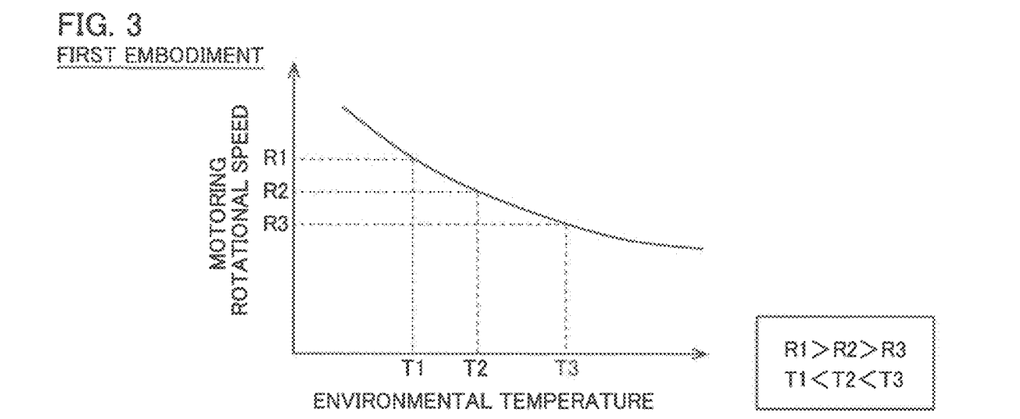
FIG. 3 A diagram showing the relationship between an environmental temperature and a motoring rotational speed according to the first embodiment.

For example, as shown in FIG. 3, when the environmental temperature is T1 [° C.], the ECU 6 sets the rotational speed (set rotational speed) of the engine body 2 at the time of motoring to R1 [rpm].

When the environmental temperature is T2 [° C.] higher than T1 [° C.], the ECU 6 sets the rotational speed (set rotational speed) of the engine body 2 at the time of motoring to R2 [rpm] smaller than R1 [rpm] (T1<T2 and R1>R2).

When the environmental temperature is T3 [° C.] higher than T2 [° C.], the ECU 6 sets the rotational speed (set rotational speed) of the engine body 2 at the time of motoring to R3 [rpm] smaller than R2 [rpm] (T2<T3 and R2>R3). As the rotational speed decreases, the noise vibration (NV) of the engine 1 can be reduced.

As an example, the rotational speed of the engine body 2 at the time of motoring is set within a range of about 1000 [rpm] or more and about 4000 [rpm] or less.

Figure 4:
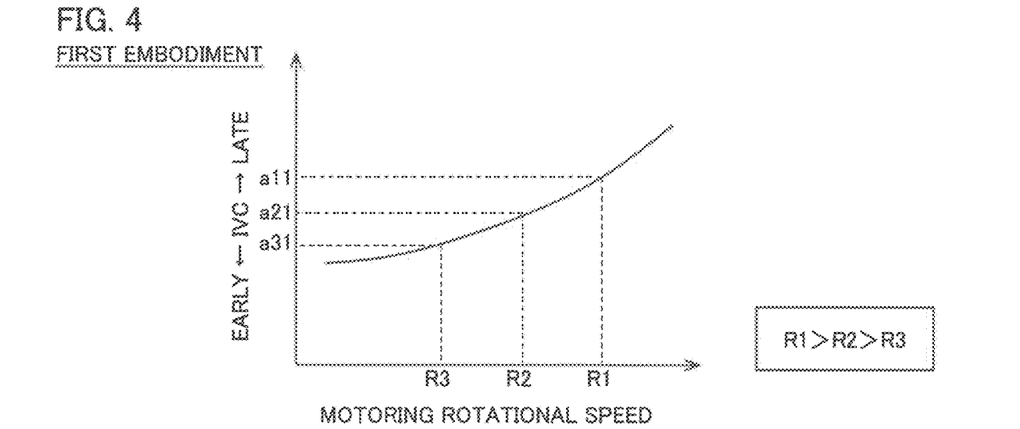
FIG. 4 A diagram showing the relationship between a motoring rotational speed and the IVC according to the first embodiment.

As shown in FIG. 4, the ECU 6 is configured or programmed to perform a timing control to set the timing at which the variable valve mechanism 3 closes the intake valve 26a to be closer to the retardation angle side as setting the predetermined rotational speed (set rotational speed) to be higher. The timing control refers to a control to set the closing timing of the intake valve 26a such that the largest amount of outside air can be introduced into the combustion chamber 23. In the timing control, the closing timing of the intake valve 26a is set to be at least on the advance angle side of an intermediate phase α between a bottom dead center and a top dead center during movement of the piston P from the bottom dead center to the top dead center (see FIG. 5).

For example, when setting the rotational speed (set rotational speed) of the engine body 2 to R1 [rpm] based on the environmental temperature of T1 [° C.], the ECU 6 sets the timing (IVC) of closing the intake valve 26a to a11 [degree]. In the following, setting for motoring in which the rotational speed is R1 and the IVC is a11 [degree] is defined as the first motoring setting.

When setting the rotational speed (set rotational speed) of the engine body 2 to R2 [rpm] based on the environmental temperature of T2 [° C.] higher than T1 [° C.], the ECU 6 sets the timing (IVC) of closing the intake valve 26a to a21 [degree] on the advance angle side of a11 [degree]. In the following, setting for motoring in which the rotational speed is R2 [rpm] and the IVC is a21 [degree] is defined as the second motoring setting.

When setting the rotational speed (set rotational speed) of the engine body 2 to R3 [rpm] based on the environmental temperature of T3 [° C.] higher than T2 [° C.], the ECU 6 sets the timing (IVC) of closing the intake valve 26a to a31 [degree] on the advance angle side of a21 [degree]. In the following, setting for motoring in which the rotational speed is R3 [rpm] and the IVC is a31 [degree] is defined as the third motoring setting.

Figure 5:
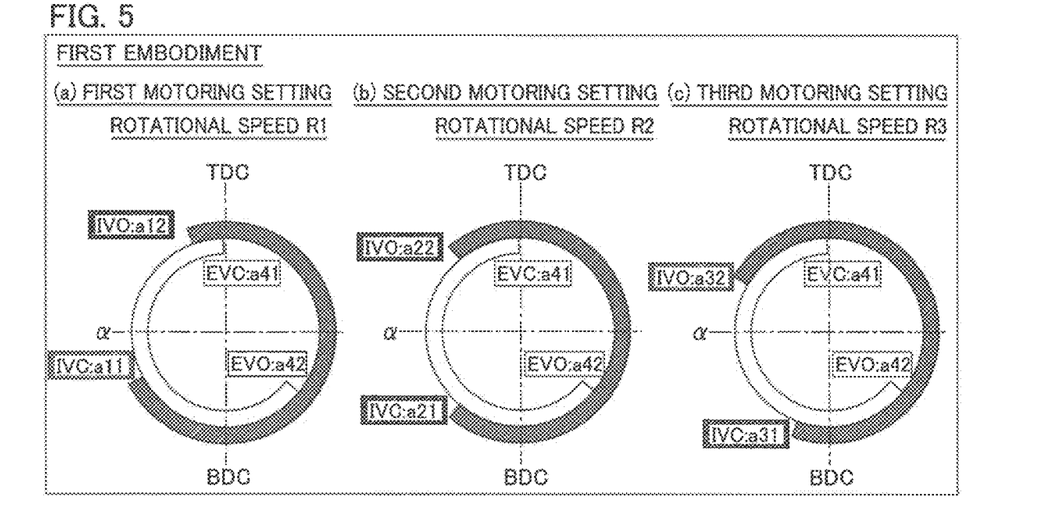
FIG. 5 Views (A) to (C) showing the valve timings at different motoring rotational speeds.

As shown in FIG. 5, the EVC and EVO are set to the same angle regardless of the motoring setting. In FIG. 5, the EVC is indicated by a41 [degree], and the EVO is indicated by a42 [degree]. Furthermore, the IVO in the first motoring setting is indicated by a12 [degree]. The IVO in the second motoring setting is indicated by a22 [degree]. The IVO in the third motoring setting is indicated by a32 [degree].

The ECU 6 is configured or programmed to supply the fuel to the chamber 23 and perform the first ignition at the timing at which the in-cylinder temperature (estimated environmental temperature) exceeds a predetermined set temperature (ignition start temperature T10 [° C.]) based on an estimation logic for estimating the temperature in the combustion chamber 23. That is, the ECU 6 is configured or programmed to perform a control to end the motoring based on the estimation logic. Note that the predetermined set temperature (ignition start temperature T10 [° C.]) in the cylinder estimated by the estimation logic is a predetermined temperature at which it is estimated that the fuel is appropriately atomized and the exhaust gas can be reduced after the first explosion. The set temperature (ignition start temperature T10 [° C.]) is a temperature common to each of the first to third motoring settings.

Figure 6:
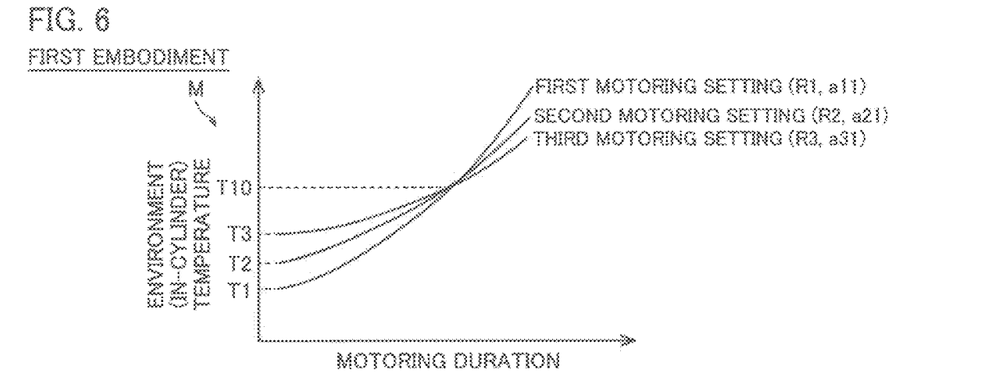
FIG. 6 A diagram showing the relationship (map) between the motoring duration and the environmental temperature according to the first embodiment.

As shown in FIG. 6, the estimation logic is a map M showing the relationship between the environmental temperature (in-cylinder temperature) and the driving duration (motoring duration) of the engine body 2 at the predetermined rotational speed.

In FIG. 6, the motoring duration for reaching the ignition start temperature T10 [° C.] in each motoring setting is shown to be substantially the same, but the motoring duration for reaching the ignition start temperature T10 [° C.] in each motoring setting may be different from each other.

The ECU 6 is configured or programmed to continue the timing control until the first cycle in which the fuel is supplied to the combustion chamber 23 and the first ignition is performed, and to control the variable valve mechanism 3 to restore the valve timing of the intake valve 26a to that during steady operation in the second and subsequent cycles. In the second and subsequent cycles, the EGR gas (exhaust gas) is recirculated from the exhaust pipe 4b to the intake pipe 4a via the EGR pipe 4c.

Control Flow at Time of Motoring by ECU

A control flow at the time of motoring by the ECU 6 is now described with reference to FIGS. 2 to 6.

First, the ECU 6 acquires the information on the environmental temperature (the temperature of the cooling water W) from the temperature sensor S1 (see FIG. 2) provided in the engine body 2 at the time of starting the engine body 2. Then, the ECU 6 sets the rotational speed of the engine body 2 to the predetermined rotational speed based on the acquired environmental temperature.

Furthermore, the ECU 6 performs a control (timing control) to adjust the timing at which the variable valve mechanism 3 closes the intake valve 26a according to the predetermined rotational speed (set rotational speed).

Next, the ECU 6 controls the electric motor 5 to drive the engine body 2 at the predetermined rotational speed (set rotational speed). Then, the ECU 6 supplies the fuel to the combustion chamber 23 and performs the first ignition at the timing at which the temperature (environmental temperature (in-cylinder temperature)) in the combustion chamber 23 exceeds the predetermined set temperature (ignition start temperature) based on the estimation logic (map M) for estimating the temperature (environmental temperature (in-cylinder temperature)) in the combustion chamber 23.

Note that the ECU 6 continues the timing control until the first cycle in which the fuel is supplied to the combustion chamber 23 and the first ignition is performed, and in the second and subsequent cycles, the ECU 6 controls the variable valve mechanism 3 to restore the valve timing of the intake valve 26a to that during steady operation.

Advantageous Effects of First Embodiment

According to the first embodiment, the following advantageous effects are achieved.

According to the first embodiment, as described above, the engine 1 includes the ECU 6 configured or programmed to perform a control to set the rotational speed of the engine body 2 to the predetermined rotational speed based on the environmental temperature at the time of starting the engine body 2, and perform a control to drive the engine body 2 at the set predetermined rotational speed during the time period until when the fuel is supplied to the combustion chamber 23 of the engine body 2 and the first ignition is performed.

Accordingly, for example, when the environmental temperature is low (in the case of cold start), it is possible to effectively warm the inside of the combustion chamber 23 due to the friction between the cylinder 24 and the piston P and inertia supercharging when the rotational speed of the engine body 2 is set to be particularly high, and thus an appropriate control to reduce the exhaust gas can be performed according to the environmental temperature of the engine 1. When the inside of the combustion chamber 23 is warmed, atomization of the fuel is promoted, and the exhaust gas generated at the time of the first ignition can be reduced.

According to the first embodiment, as described above, the engine 1 further includes the variable valve mechanism 3 capable of adjusting the opening-closing timing of the intake valve 26a under control of the ECU 6, and the ECU 6 is configured or programmed to perform the timing control to set the closing timing of the intake valve 26a based on the predetermined rotational speed such that the largest amount of outside air can be introduced. Accordingly, the (largest amount of) outside air can be effectively introduced into the combustion chamber 23 in consideration of inertia supercharging and intake pulsation based on the rotational speed of the engine body 2, for example. Consequently, the pressure in the cylinder 24 is effectively increased such that the inside of the combustion chamber 23 can be effectively warmed, and thus a more appropriate control to reduce the exhaust gas can be performed according to the environmental temperature of the engine 1. From the viewpoint of inertia supercharging, when the closing timing (IVC) of the intake valve 26a is closer to the retardation angle side as the rotational speed of the engine 1 increases, the intake amount increases. However, considering intake pulsation (air resistance), the inertia supercharging effect becomes large when the rotational speed of the engine 1 is medium (about 3000 rpm to about 4000 rpm), and the inertia supercharging effect becomes small when the rotational speed of the engine 1 is high. Therefore, when the engine 1 is rotating at high speed, the intake amount may be larger on the advance angle side.

According to the first embodiment, as described above, the ECU 6 is configured or programmed to continue the timing control until the first cycle in which the fuel is supplied to the combustion chamber 23 and the first ignition is performed, and to control the variable valve mechanism 3 to restore the valve timing of the intake valve 26a to that during steady operation in the second and subsequent cycles (ignition control). In the second and subsequent cycles, the intake amount is increased due to the influence of recirculation of the EGR gas, for example, as compared with the first cycle, and thus it is necessary to set the valve timing to the predetermined valve timing. Therefore, with the structure described above, the timing control can be continued for a longer time as compared with a case in which the timing control is finished only at the initial stage of a period before the first ignition, and thus the inside of the combustion chamber 23 can be more effectively warmed. Consequently, a more appropriate control to reduce the exhaust gas can be performed according to the environmental temperature of the engine 1.

According to the first embodiment, as described above, the ECU 6 is configured or programmed to supply the fuel to the combustion chamber 23 and perform the first ignition at the timing at which the temperature in the combustion chamber 23 exceeds the predetermined set temperature based on the estimation logic for estimating the temperature in the combustion chamber 23. Accordingly, the estimation logic is used such that the ECU 6 does not need to perform a calculation to determine the timing for the first ignition, and thus the control load on the ECU 6 can be reduced.

According to the first embodiment, as described above, the estimation logic includes the map M showing the relationship between the temperature in the combustion chamber 23 and the driving duration of the engine body 2 at the predetermined rotational speed. Accordingly, with the map M showing the relationship between the temperature in the combustion chamber 23 and the driving duration (motoring duration) of the engine body 2 at the predetermined rotational speed, the timing for the first ignition can be easily determined without performing a complex calculation.

According to the first embodiment, as described above, the engine 1 further includes the electric motor 5 to drive the piston P, and the ECU 6 is configured or programmed to set the rotational speed of the engine body 2 to the predetermined rotational speed based on the environmental temperature at the time of starting the engine body 2, and to control the electric motor 5 to drive the engine body 2 at the set predetermined rotational speed during the time period until when the fuel is supplied to the combustion chamber 23 and the first ignition is performed. Accordingly, motoring is performed by the electric motor 5 such that an appropriate control to reduce the exhaust gas can be performed according to the environmental temperature of the engine 1.

Second Embodiment

A second embodiment of the present invention is now described with reference to FIGS. 1 and 7 to 9. In this second embodiment, an example in which the timing at which an ECU 206 (an example of a controller) closes an intake valve 26a is further retarded from the timing (see FIG. 5) according to the first embodiment without performing a timing control (an example in which a super retardation angle control is performed) is described, unlike the first embodiment in which the timing control is performed by the ECU 6. The same or similar structures as those of the first embodiment are denoted by the same reference numerals as those of the first embodiment, and description thereof is omitted.

Figure 7:
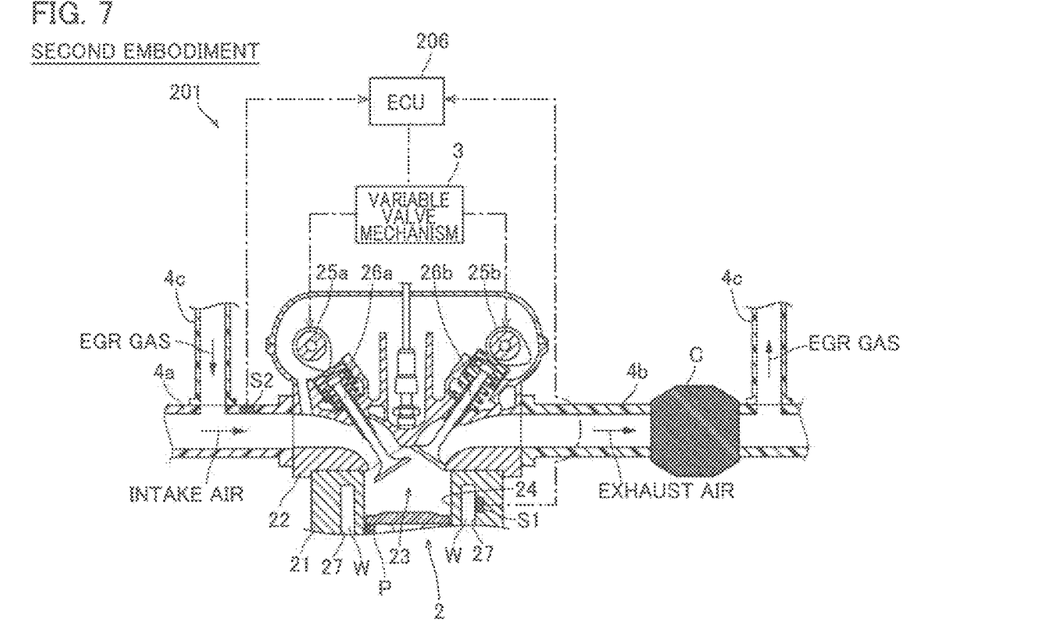
FIG. 7 A diagram showing the structure of an engine, a variable valve mechanism, and an ECU according to a second embodiment.

An engine 201 (an example of an internal combustion engine) according to the second embodiment shown in FIG. 7 includes the ECU 206 configured or programmed to perform the super retardation angle control to set the closing timing of the intake valve 26a to be on the retardation angle side. Furthermore, the engine 201 includes a temperature sensor S2 to measure the temperature of gas in an intake pipe 4a. The temperature sensor S2 is provided on the downstream side of a throttle valve (not shown).

The super retardation angle control refers to controlling a variable valve mechanism 3 by the ECU 206 to set the relative rotation phase of the intake valve 26a to be on the retardation angle side so as to reach a phase in which the engine 201 cannot be started and the engine 201 cannot operate autonomously even when a fuel is injected into the engine 201 and ignited.

Figure 8:
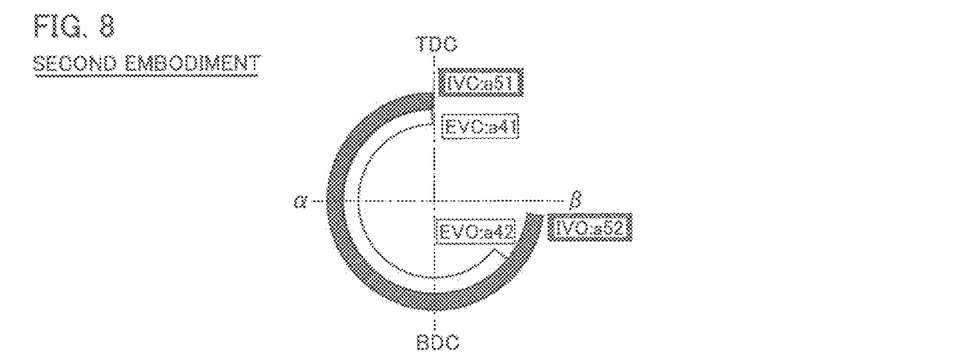
FIG. 8 A diagram showing the valve timing during very late valve closing control according to the second embodiment.

Specifically, as shown in FIG. 8, the ECU 206 is configured or programmed to close the intake valve 26a (set the IVC to a52 [degree]) on the retardation angle side of an intermediate phase α between a bottom dead center and a top dead center while a piston P moves from the bottom dead center to the top dead center during a time period until when the fuel is supplied to a combustion chamber 23 and the first ignition is performed. More specifically, the ECU 206 is configured or programmed to close the intake valve 26a at the top dead center (or in the vicinity of the top dead center) during the time period until when the fuel is supplied to the combustion chamber 23 and the first ignition is performed.

As an example, when the IVC is set to a52 [degree], the IVO is set to a51 [degree] on the retardation angle side of an intermediate phase β between the top dead center and the bottom dead center during movement of the piston P from the top dead center to the bottom dead center.

When the super retardation angle control is performed, the engine 206 shown in FIG. 7 is configured to blow back a gas in a cylinder 24 to the intake pipe 4a side in substantially all of phases (time) from when the piston P reaches the bottom dead center to when the piston P reaches the top dead center in a state in which the intake valve 26a is opened. At this time, the temperature of the gas in the cylinder 24 rises due to frictional heat generated by sliding of the piston P along the inner peripheral surface of the cylinder 24, and the gas with increased temperature (high-temperature gas) is blown back from the inside of the cylinder 24 to the intake pipe 4a side. Consequently, when the fuel is injected from an injector (not shown) that injects the fuel into an intake passage, the fuel can be effectively atomized.

The ECU 206 is configured or programmed to supply the fuel to the combustion chamber 23 and perform the first ignition by injecting the fuel from the injector at the timing at which the temperature measured by the temperature sensor S2 exceeds a predetermined set temperature.

Control Process by ECU at Time of Starting Engine

Figure 9:
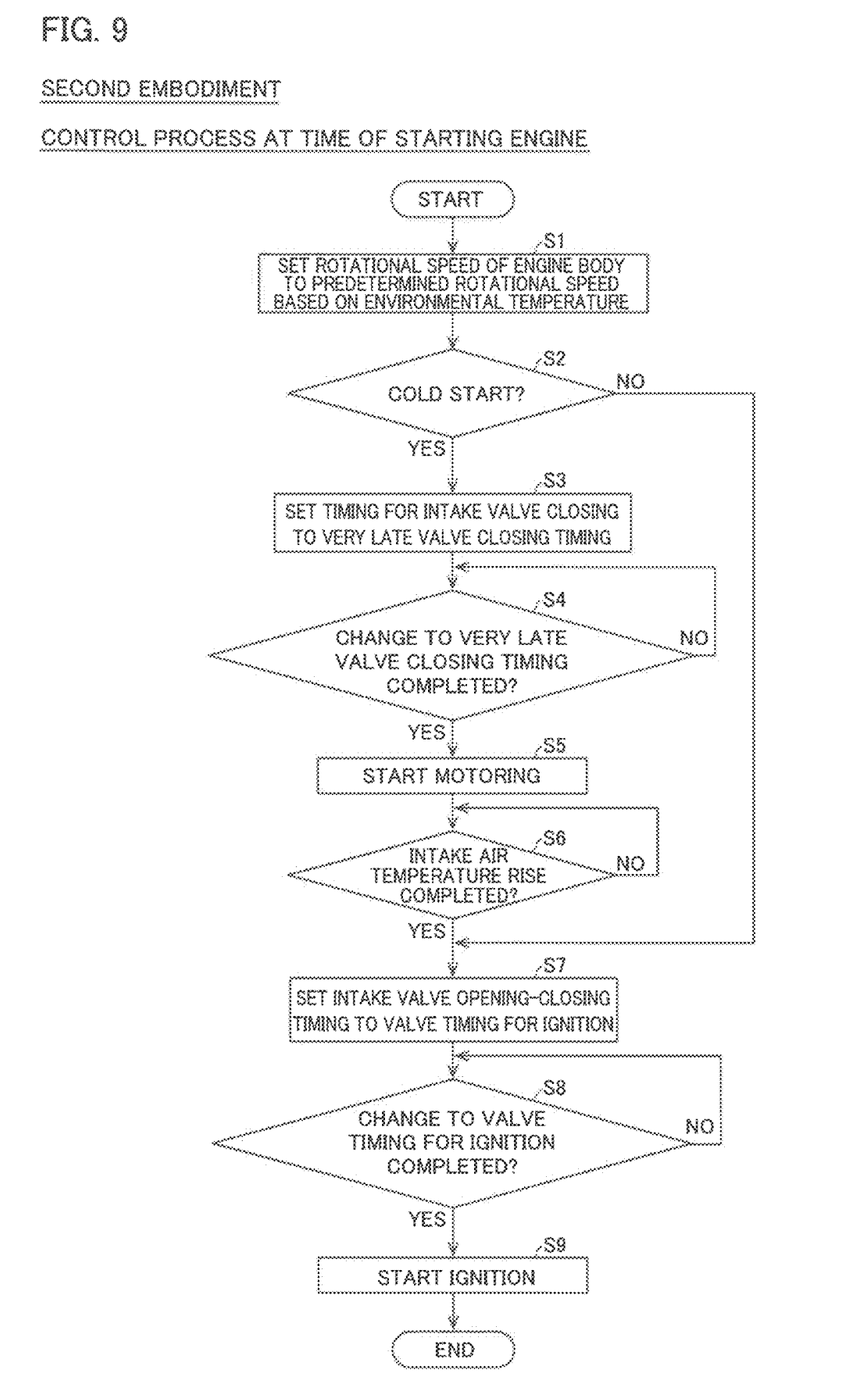
FIG. 9 A flowchart showing a control process at the time of starting the engine by the ECU of the engine according to the second embodiment.

A control process performed by the ECU 206 at the time of starting the engine is now described with reference to FIG. 9.

First, in step S1, the ECU 206 sets the rotational speed of an engine body 2 to a predetermined rotational speed based on an environmental temperature. This control is the same or similar as that of the first embodiment, and thus description thereof is omitted.

Next, in step S2, the ECU 206 determines whether or not cold start has been performed based on the environmental temperature acquired via a temperature sensor S1. For example, the ECU 206 determines whether or not cold start has been performed by determining whether the environmental temperature acquired via the temperature sensor S1 is equal to, greater than, or less than a predetermined threshold temperature. When cold start has been performed, the process advances to step S3. When cold start has not been performed, the process advances to step S7.

Next, in step S3, the ECU 206 performs the super retardation angle control. That is, the ECU 206 sets the closing timing of the intake valve 26a to the valve timing (very late valve closing timing shown in FIG. 8) at which the intake valve 26a is closed at the top dead center (or in the vicinity of the top dead center).

Next, in step S4, the ECU 206 determines whether or not the closing timing of the intake valve 26a has been changed to the very late valve closing timing as set in step S3 via the variable valve mechanism 12. When the closing timing has been changed to the very late valve closing timing, the process advances to step S5. On the other hand, when the closing timing has not been changed to the very late valve closing timing, the operation in step S4 is repeated. The determination by the ECU 206 in step S4 is performed using a predetermined rotation angle sensor (not shown) provided in the variable valve mechanism 12, for example. The same applies to step S8 described below.

Next, in step S5, an electric motor 5 (see FIG. 1) is driven by the ECU 206 to start motoring (driving of the piston P). Consequently, the temperature of the gas in the cylinder 24 starts to rise due to the frictional heat generated by sliding of the piston P along the inner peripheral surface of the cylinder 24.

Next, in step S6, the ECU 206 determines whether or not the temperature of the gas measured by the temperature sensor S2 (see FIG. 7) exceeds the predetermined set temperature. When the temperature measured by the temperature sensor S2 exceeds the predetermined set temperature, the process advances to step S7. On the other hand, when the temperature measured by the temperature sensor S2 does not exceed the predetermined set temperature, the operation in step S6 is repeated.

Next, in step S7, the ECU 206 sets the opening-closing timing of the intake valve 26a to the predetermined valve timing for ignition.

Next, in step S8, the ECU 206 determines whether or not the opening-closing timing of the intake valve 26a has been changed to the predetermined valve timing for igniting as set in step S7 via the variable valve mechanism 12. When the opening-closing timing of the intake valve 26a has been changed to the predetermined valve timing for ignition, the process advances to step S9. On the other hand, when the opening-closing timing of the intake valve 26a has not been changed to the predetermined valve timing for ignition, the operation in step S8 is repeated.

Next, in step S9, the ECU 206 starts ignition of the engine 201.

Advantageous Effects of Second Embodiment

According to the second embodiment, the following advantageous effects are achieved.

According to the second embodiment, as described above, the engine 201 includes the variable valve mechanism 12 capable of adjusting the opening-closing timing of the intake valve 26a under control of the ECU 206, and the ECU 206 is configured or programmed to close the intake valve 26a on the retardation angle side of the intermediate phase a between the bottom dead center and the top dead center while the piston P moves from the bottom dead center to the top dead center during the time period until when the fuel is supplied to the combustion chamber 23 and the first ignition is performed. Accordingly, the gas in the cylinder 24, the temperature of which has risen due to the friction between the piston P and the cylinder 24, for example, can be blown back to the intake pipe 4a side for a relatively long time during movement of the piston P from the bottom dead center to the top dead center. That is, the high-temperature gas can be blown back to the intake pipe 4a side for a time longer than at least half of the time required for the piston P to move from the bottom dead center to the top dead center. Consequently, atomization of the fuel can be effectively promoted, and thus unburned fuel can be reduced while an exhaust gas can be reduced. Thus, the fuel injection amount at the time of cold start can also be reduced. The exhaust gas can be reduced, and thus the amount of precious metal used as a catalyst may be reduced.

According to the second embodiment, as described above, the ECU 206 is configured or programmed to close the intake valve 26a at the top dead center or in the vicinity of the top dead center during the time period until when the fuel is supplied to the combustion chamber 23 and the first ignition is performed. Accordingly, the high-temperature gas in the cylinder 24 can be blown back to the intake pipe 4a side for a longer time while the piston P moves from the bottom dead center to the top dead center. Consequently, atomization of the fuel can be promoted more effectively.

According to the second embodiment, as described above, the engine 201 includes the temperature sensor S2 to measure the temperature in the intake pipe 4a, and the ECU 206 is configured or programmed to supply the fuel to the combustion chamber 23 and perform the first ignition at the timing at which the temperature measured by the temperature sensor S2 exceeds the predetermined set temperature. Accordingly, the timing at which the fuel is supplied to the combustion chamber 23 and the first ignition is performed can be accurately determined with the temperature sensor S2.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the environmental temperature is set as the temperature of the engine cooling water has been shown in each of the aforementioned first and second embodiments, the present invention is not restricted to this. In the present invention, the environmental temperature may be set as the outside air temperature around the engine body, the intake temperature, or the temperature outside the vehicle (outside air temperature), for example.

While the example in which at the time of motoring, the ECU changes the valve timing of the intake valve to the timing different from that during normal steady operation (the timing control is performed) has been shown in the aforementioned first embodiment, the present invention is not restricted to this. In the present invention, for example, at the time of motoring, the valve timing of the intake valve may be set to the same timing as that during normal steady operation (the timing control may not be performed).

While the example in which the estimation logic is the map showing the relationship between the temperature in the combustion chamber and the driving duration of the engine body at the predetermined rotational speed has been shown in the aforementioned first embodiment, the present invention is not restricted to this. In the present invention, for example, the estimation logic may be a predetermined calculating formula for deriving the temperature in the combustion chamber from the driving duration of the engine body at the predetermined rotational speed.

While the example in which the timing for the first ignition is determined by the ECU based on the estimation logic has been shown in the aforementioned first embodiment, the present invention is not restricted to this. In the present invention, for example, the timing for the first ignition may be determined by the ECU based on the measurement result of a temperature sensor or the like capable of measuring the temperature in the combustion chamber instead of the estimation logic.

While the example in which as shown in FIG. 3, the rotational speed of the engine body is set with a non-linear (quadratic curve) relationship with the environmental temperature has been shown in each of the aforementioned first and second embodiments, the present invention is not restricted to this. In the present invention, for example, the rotational speed of the engine body may be set with a linear relationship with the environmental temperature.

While the example in which at the time of motoring by the electric motor, the predetermined control is performed by the ECU has been shown in the aforementioned first embodiment, the present invention is not restricted to this. In the present invention, at the time of cranking by a starter motor, the predetermined control may be performed by the ECU.

While the example in which the set temperature (ignition start temperature) is a temperature common to each of the first to third motoring settings has been shown in the aforementioned first embodiment, the present invention is not restricted to this. In the present invention, the set temperature (ignition start temperature) may be a temperature different from each other for the first to third motoring settings. For example, the set temperature (ignition start temperature) may be a temperature obtained by adding T [° C.] (20 [° C.], for example) to the environmental temperature at the start of motoring in each of the first to third motoring settings.

While the example in which the ECU is configured or programmed to set the closing timing of the intake valve to be closer to the retardation angle side as setting the predetermined rotational speed (set rotational speed) to be higher has been shown in the aforementioned first embodiment, the present invention is not restricted to this. In the present invention, the ECU may be configured or programmed to set the closing timing of the intake valve to be closer to the advance angle side as setting the predetermined rotational speed (set rotational speed) to be higher.

While the example in which the timing for the first ignition is determined based on the temperature sensor provided on the intake pipe has been shown in the aforementioned second embodiment, the present invention is not restricted to this. In the present invention, as in the first embodiment, the timing for the first ignition may be determined based on an estimation logic.

While the example in which the process operations performed by the controller are described using a flow in a flow-driven manner in which processes are performed in order along a process flow for the convenience of illustration in the aforementioned second embodiment, the present invention is not restricted to this. In the present invention, the process operations performed by the controller may be performed in an event-driven manner in which the processes are performed on an event basis. In this case, the process operations performed by the controller may be performed in a complete event-driven manner or in a combination of an event-driven manner and a flow-driven manner.

DESCRIPTION OF REFERENCE NUMERALS

1, 201: engine (internal combustion engine)
2: engine body (internal combustion engine body)
3: variable valve mechanism 4*a*: intake pipe
6, 206: ECU (controller)
10: electric motor (hybrid drive motor)
23: combustion chamber
26*a*: intake valve
26*b*: exhaust valve
P: piston
S2: temperature sensor

The invention claimed is:

1. An internal combustion engine comprising:
an internal combustion engine body including an intake valve and an exhaust valve;
a controller configured or programmed to perform a control to set a rotational speed of the internal combustion engine body to a predetermined rotational speed based on an environmental temperature at a time of starting the internal combustion engine body, and perform a control to drive the internal combustion engine body at the set predetermined rotational speed during a time period until when fuel is supplied to a combustion chamber of the internal combustion engine body and first ignition is performed; and
a variable valve mechanism configured to adjust an opening-closing timing of the intake valve under control of the controller; wherein
the controller is configured or programmed to perform a timing control to set a closing timing of the intake valve based on the predetermined rotational speed such that a largest amount of outside air is introduced.

2. The internal combustion engine according to claim 1, wherein the controller is configured or programmed to continue the timing control until a first cycle in which the fuel is supplied to the combustion chamber and the first ignition is performed, and to control the variable valve mechanism to restore a valve timing of the intake valve to that during steady operation in second and subsequent cycles.

3. An internal combustion engine comprising:
an internal combustion engine body including an intake valve and an exhaust valve; and
a controller configured or programmed to perform a control to set a rotational speed of the internal combustion engine body to a predetermined rotational speed based on an environmental temperature at a time of starting the internal combustion engine body, and perform a control to drive the internal combustion engine body at the set predetermined rotational speed during a time period until when fuel is supplied to a combustion chamber of the internal combustion engine body and first ignition is performed; wherein
the controller is configured or programmed to supply the fuel to the combustion chamber and perform the first ignition at a timing at which a temperature in the combustion chamber exceeds a predetermined set temperature based on an estimation logic for estimating the temperature in the combustion chamber.

4. The internal combustion engine according to claim 3, wherein the estimation logic includes a map showing a relationship between the temperature in the combustion chamber and driving duration of the internal combustion engine body at the predetermined rotational speed.

5. An internal combustion engine comprising:
an internal combustion engine body including an intake valve and an exhaust valve;
a controller configured or programmed to perform a control to set a rotational speed of the internal combustion engine body to a predetermined rotational speed based on an environmental temperature at a time of starting the internal combustion engine body, and perform a control to drive the internal combustion engine body at the set predetermined rotational speed during a time period until when fuel is supplied to a combustion chamber of the internal combustion engine body and first ignition is performed; and
a temperature sensor to measure a temperature in an intake pipe; wherein
the controller is configured or programmed to supply the fuel to the combustion chamber and perform the first ignition at a timing at which the temperature measured by the temperature sensor exceeds a predetermined set temperature.

6. The internal combustion engine according to claim 1, wherein the environmental temperature includes at least one of a temperature of outside air around the internal combustion engine body or a temperature of cooling water of the internal combustion engine body.

7. The internal combustion engine according to claim 1, further comprising:
a hybrid drive motor to drive a piston; wherein
the controller is configured or programmed to set the rotational speed of the internal combustion engine body to the predetermined rotational speed based on the environmental temperature at the time of starting the internal combustion engine body, and to control the hybrid drive motor to drive the internal combustion engine body at the set predetermined rotational speed during the time period until when the fuel is supplied to the combustion chamber and the first ignition is performed.

8. The internal combustion engine according to claim 3, wherein the environmental temperature includes at least one of a temperature of outside air around the internal combustion engine body or a temperature of cooling water of the internal combustion engine body.

9. The internal combustion engine according to claim 3, further comprising:
a hybrid drive motor to drive a piston; wherein
the controller is configured or programmed to set the rotational speed of the internal combustion engine body to the predetermined rotational speed based on the environmental temperature at the time of starting the internal combustion engine body, and to control the hybrid drive motor to drive the internal combustion engine body at the set predetermined rotational speed during the time period until when the fuel is supplied to the combustion chamber and the first ignition is performed.

10. The internal combustion engine according to claim 5, wherein the environmental temperature includes at least one of a temperature of outside air around the internal combustion engine body or a temperature of cooling water of the internal combustion engine body.

11. The internal combustion engine according to claim 5, further comprising:
a hybrid drive motor to drive a piston; wherein
the controller is configured or programmed to set the rotational speed of the internal combustion engine body to the predetermined rotational speed based on the environmental temperature at the time of starting the internal combustion engine body, and to control the hybrid drive motor to drive the internal combustion engine body at the set predetermined rotational speed during the time period until when the fuel is supplied to the combustion chamber and the first ignition is performed.

\* \* \* \* \*